United States Patent
Molenaar

[19]

[11] Patent Number: 6,125,699
[45] Date of Patent: Oct. 3, 2000

[54] ADJUSTABLE MEASURING SPOON

[76] Inventor: Steven L. Molenaar, 601 W. Highway 40, Willmar, Minn. 56201

[21] Appl. No.: 09/220,424

[22] Filed: Dec. 24, 1998

Related U.S. Application Data

[63] Continuation-in-part of application No. 29/083,373, Feb. 9, 1998, Pat. No. Des. 403,255.

[51] Int. Cl.$^7$ .................................................. G01F 19/00
[52] U.S. Cl. ............................................................. 73/429
[58] Field of Search .............................. 73/426, 727, 728, 73/729, 429; 33/524; D10/46.2

[56] References Cited

U.S. PATENT DOCUMENTS

| | | |
|---|---|---|
| D. 328,867 | 8/1992 | Watt et al. . |
| 2,165,642 | 10/1937 | Mayer . |
| 2,389,530 | 6/1944 | Miner . |
| 2,854,849 | 11/1955 | Setecka . |
| 3,690,182 | 9/1972 | Rodriguez . |
| 3,798,975 | 3/1974 | Horst . |
| 4,616,867 | 10/1986 | O'Hara ........................................ 294/55 |
| 5,182,948 | 2/1993 | Robbins et al. . |
| 5,448,913 | 9/1995 | Robbins et al. ............................ 73/429 |
| 5,460,042 | 10/1995 | Tucker ........................................ 73/429 |

*Primary Examiner*—Benjamin R. Fuller
*Assistant Examiner*—Abdullahi Aw-Musse
*Attorney, Agent, or Firm*—Burd, Bartz & Gutenkauf

[57] ABSTRACT

A spoon-shaped measuring device for measuring out different amounts of ingredients has a swinging gate having a divider which extends into the measuring compartment of the measuring device. The gate has a pair of inwardly directed protrusions accommodated by radial spaced grooves in a rib located on the side wall of the handle and measuring compartment to releasably hold the measuring position of the divider and set the volume of the measuring compartment as desired. A pivot releasably connects the gate to the handle of the device to facilitate cleaning.

19 Claims, 4 Drawing Sheets

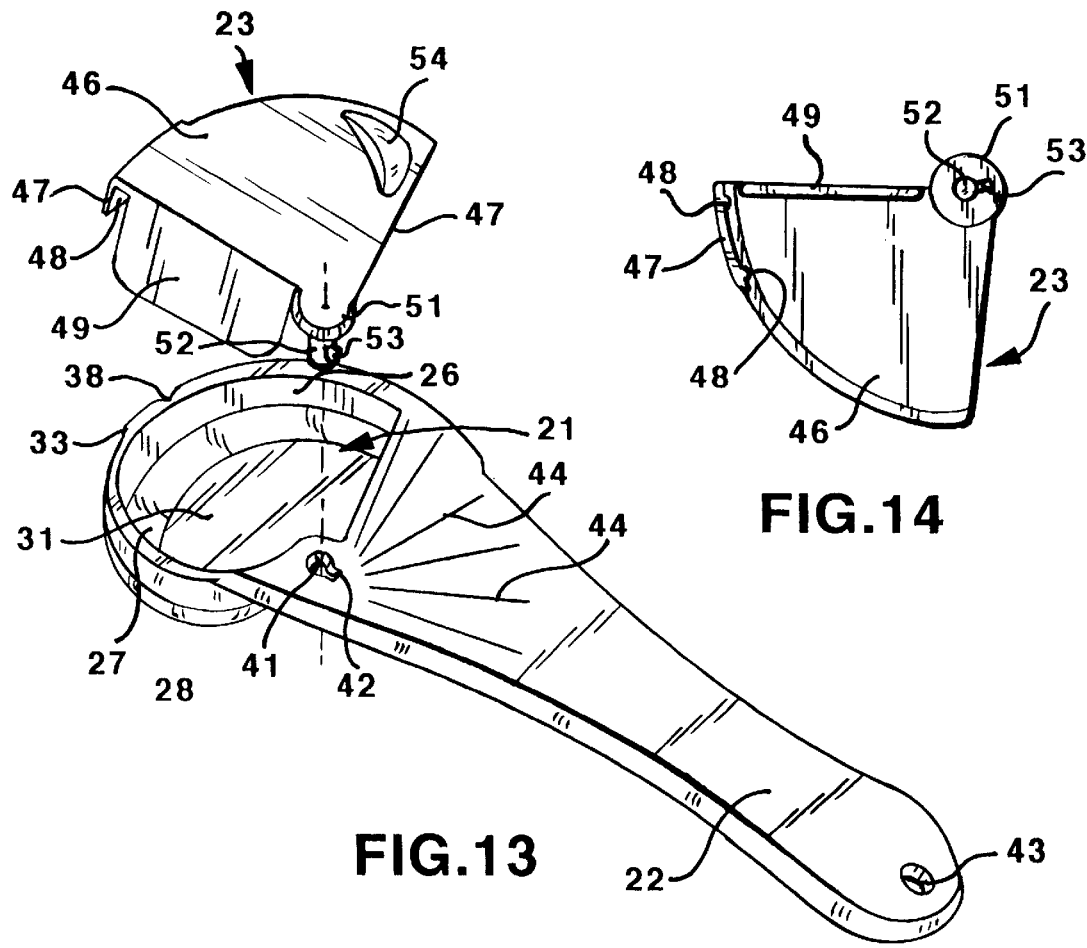
FIG.14
FIG.13
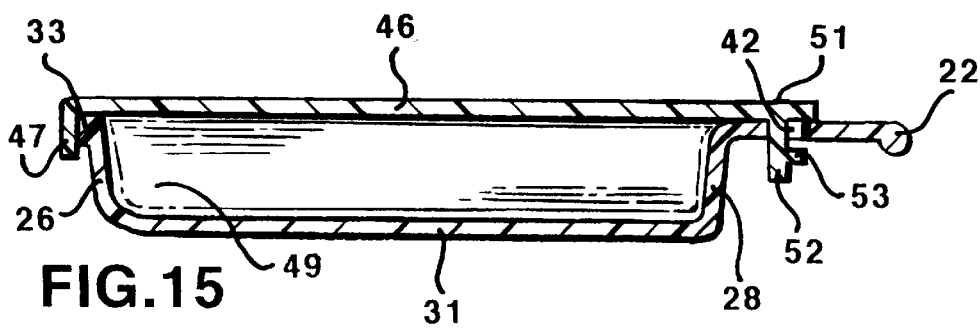
FIG.15
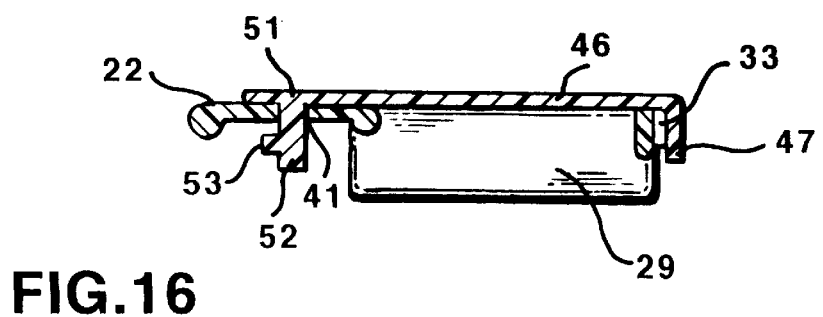
FIG.16

ADJUSTABLE MEASURING SPOON

CROSS REFERENCE TO RELATED APPLICATION

This application is a continuation-in-part of U.S. application Ser. No. 29/083,373 filed Feb. 9, 1998, now U.S. Pat. No. Des. 403,255.

FIELD OF THE INVENTION

The invention relates to measuring utensils, and particularly to adjustable measuring spoons which can be adjusted to measure liquids and particulate materials, such as baking ingredients in selected quantities.

BACKGROUND OF THE INVENTION

Previously, a set of measuring spoons each of a different sized measure has been used when measuring out small quantities of liquids or particulate materials for baking recipes, cleaning solution mixtures, plant fertilizer mixtures, medicine dosages and the like. Often it is necessary to search for a separate spoon having the desired sized measure.

SUMMARY OF THE INVENTION

The invention is directed to an adjustable measuring spoon useable to measure out a various specific amounts of liquids or particulate materials such as baking ingredients, spices, concentrated cleaning fluids, plant fertilizer chemicals, medicine and the like. The adjustable measuring spoon is easy to use, easy to clean and inexpensive to manufacture. The measuring spoon has a gate that swings or pivots to adjust the measuring capacity of the bowl. A pivot means releasably connects the gate to the body of the spoon. The gate has a partition that extends into the bowl to determine the size of bowl. When the gate pivots about the pivot means the partition swings within the bowl to adjust the measuring size of the bowl as desired. The gate is easily separated from the body to facilitate cleaning of the spoon.

DESCRIPTION OF THE DRAWINGS

FIG. 13 is an exploded perspective view of the adjustable measuring spoon;

FIG. 14 is a bottom plan view of the swinging gate of the adjustable measuring spoon;

FIG. 15 is a sectional view taken along the line 15—15 of FIG. 2; and

FIG. 16 is a sectional view taken along the line 16—16 of FIG. 3.

DESCRIPTION OF THE PREFERRED EMBODIMENT

Figure 1:
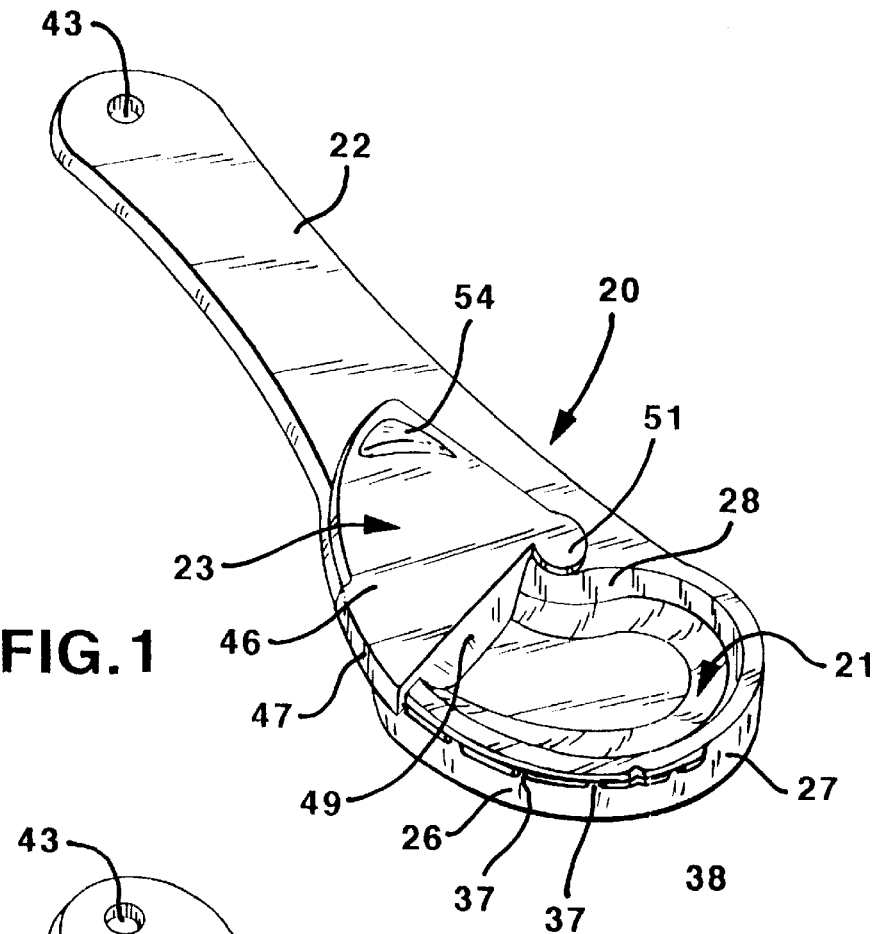
FIG. 1 is a top, front left side perspective view of the adjustable measuring spoon of the invention showing the swinging gate in a first open position.
Figure 2:
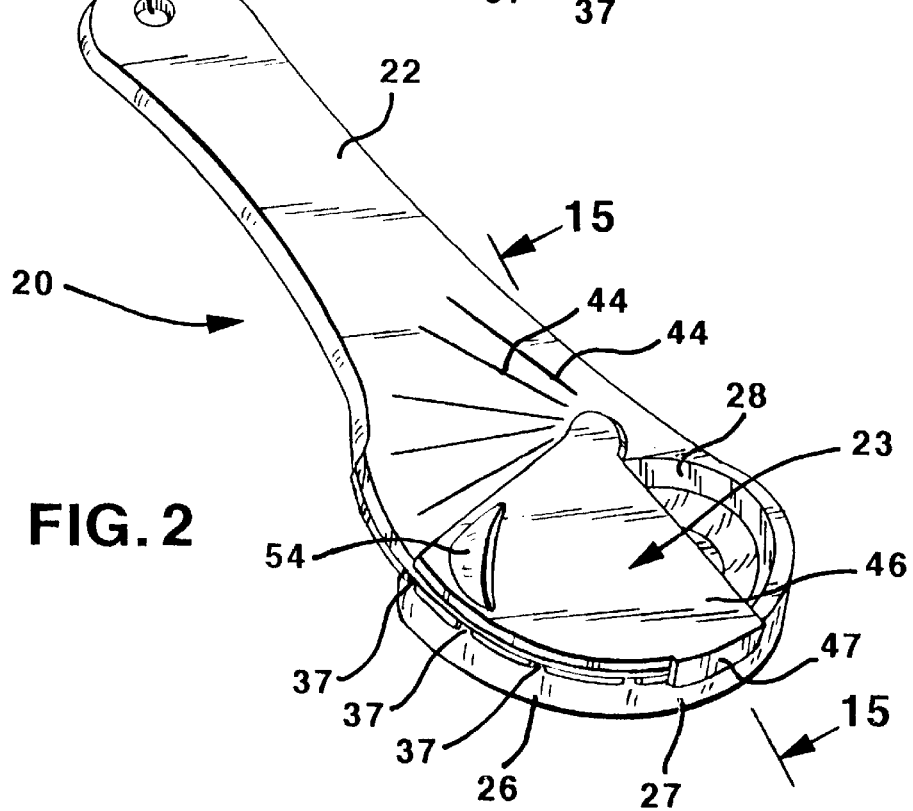
FIG. 2 is a perspective view similar to FIG. 1 showing the swinging gate in the sixth open position.
Figure 3:
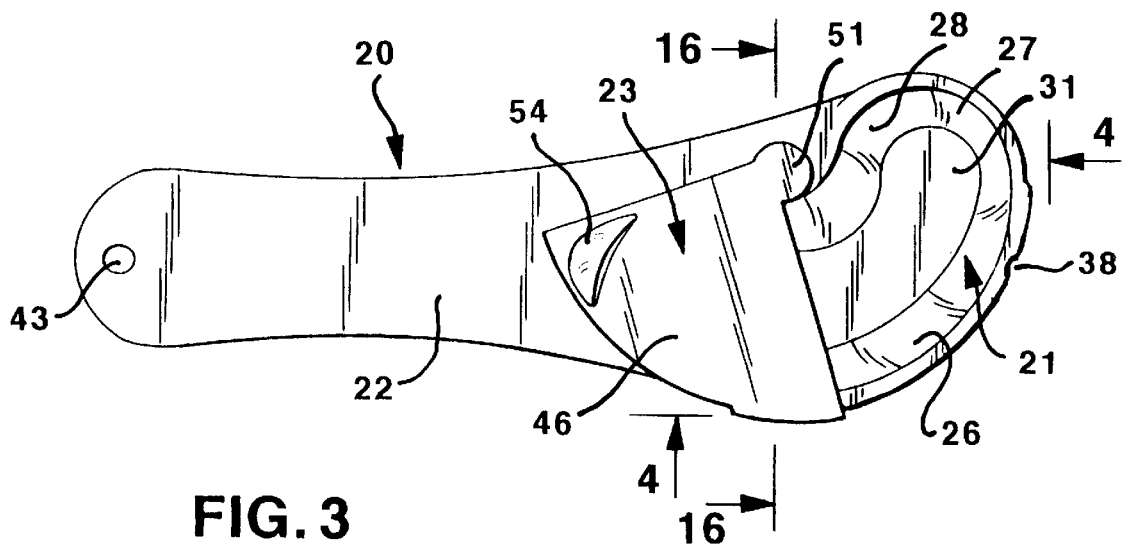
FIG. 3 is a top plan view of the adjustable measuring spoon of FIG. 1.

Referring to FIGS. 1 to 3, there is shown an adjustable measuring spoon of the invention, indicated generally at 20. Spoon 20 is a utensil used for accurate measurement of relatively small quantities of fluids and substances essential for baking recipes, cleaning and fertilizer mixtures, medicine dosages, and other mixtures and formulations. The capacity of spoon 20 is adjustable to allow measurement of a wide spectrum of quantities of materials. Spoon 20 is made from molded plastic. Other materials such as such metal or aluminum can be used to make spoon 20.

Spoon 20 has a handle or body 22 having inwardly tapered sides to facilitate gripping of the spoon. The forward end of body 22 has an oval-shaped bowl 21 having a maximum measuring capacity of three teaspoons or one tablespoon. The opposite end of body 22 has a hole 43 to accommodate a hook or nail. Bowl 21 can have other maximum capacities that are higher or lower than one tablespoon. A swinging or pivoting gate 23 is releasably connected to body 22 with a pivot 51. Gate 23 can be pivoted about pivot 51 to five different open positions to adjust the measuring size of bowl 21 between one tablespoon and one teaspoon in ½ teaspoon increments. Gate 23 can have other incremental measurements that are more than or less than ½ teaspoon. Reference indicia 44 are imprinted on the top of body 22 to indicate the measuring size of bowl 21 when gate 23 is in a selected open position. Gate 23 is moveable to a sixth open position or release position, as seen in FIG. 2, whereby gate 23 and body 22 can be separated to facilitate cleaning of spoon 20.

Body 22 has downwardly directed side walls 26 and 28, front wall 27, and a back wall 29 joined to a generally flat bottom wall 31 to define bowl 21. Side wall 26 curves outwardly from front wall 27 to back wall 29 and has a circular arc shape. Side wall 28 extends between walls 27 and 29 opposite from side wall 26 and has a concave curved shape. The curvatures of side walls 26 and 28 are substantially concentric having opening 41 in body 22 accommodating pivot 51 as a common vertical axis. This allows the partition 49 of gate 23 to swing within bowl 21 while having a sliding fit relation with the inner surfaces of side walls 26 and 28 and bottom wall 31.

Figure 9:
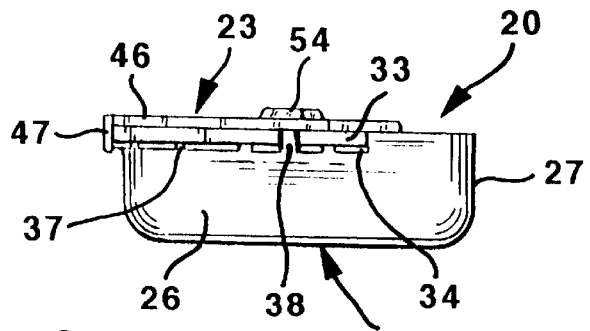
FIG. 9 is a front elevational view of FIG. 1.
Figure 10:
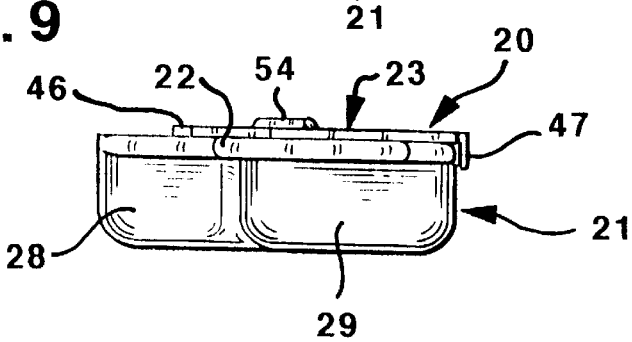
FIG. 10 is a rear elevational view of FIG. 1.

Front wall 27 of body 22 is joined to side walls 26 and 28 and has a convex curved shape. As seen in FIGS. 9 and 10, back wall 29 is generally flat and is connected to the inner ends of side walls 26 and 28. Back wall 29 has a size and shape that are substantially the same as the size and shape of partition 49 of gate 23. Partition 49 is located flush against back wall 29 when gate 23 is in the first open position or largest capacity position, as seen in FIGS. 1 and 3.

Referring to FIGS. 4 to 8, an arcuate strip or lip 33 extends along the side edge of body 22 and along the top of side wall 26. Lip 33 projects outwardly away from the side edge of body 22 and side wall 26. Lip 33 cooperates with protrusions 48 of a curved flange 47 of gate 23 to hold gate 23 on body 22. An arcuate rib 34 projects outwardly from body 22 and side wall 26 adjacent the lower edge of lip 33. The length of rib 34 is substantially the same as the length of lip 33. Rib 34 has an outward projection that is slightly less than the outward projection of lip 33 to recede the outer surface of rib 34 from the lower edge of lip 33.

Figures 4, 5, 6:
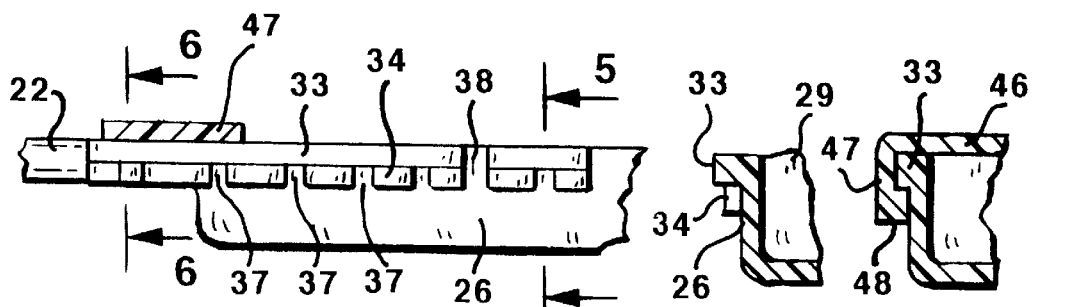
FIG. 4 is a sectional view taken along the curved line 4—4 of FIG. 3.
FIG. 5 is a sectional view taken along the line 5—5 of FIG. 4.
FIG. 6 is a sectional view taken along the line 6—6 of FIG. 4.
Figure 7:
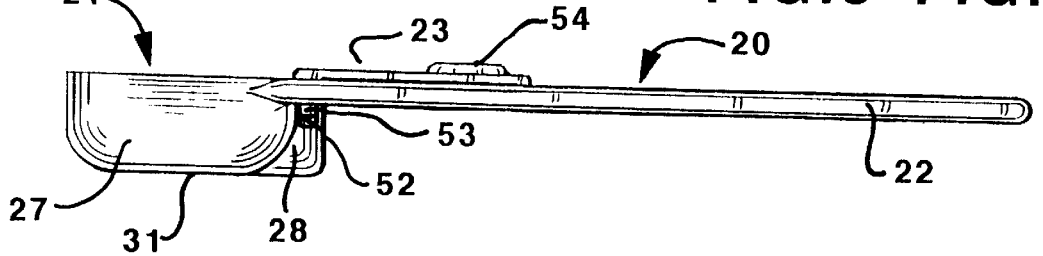
FIG. 7 is a right side elevational view of FIG. 1.
Figure 8:
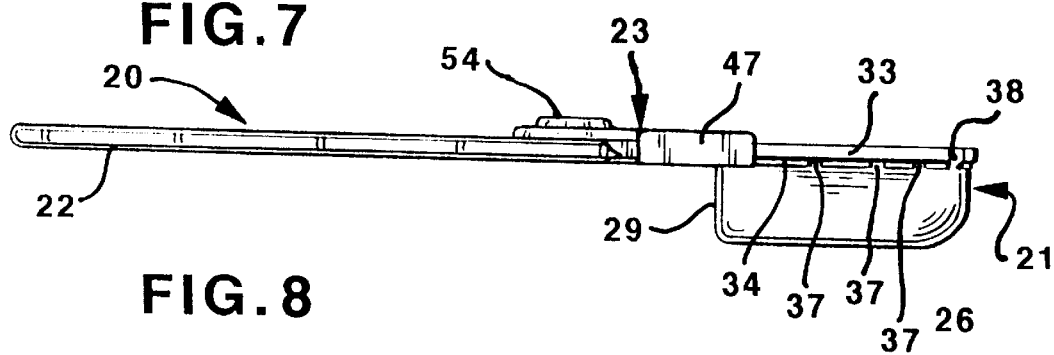
FIG. 8 is a left side elevational view of FIG. 1.

As seen in FIG. 4, rib 34 has a plurality of radially spaced grooves 37. Grooves 37 determine the open positions of gate 23. Rib 34 can have additional grooves to increase the number of open positions of gate 23. Protrusions 48 on flange 47 extend into grooves 37 and engage the lower edge of lip 33 to releasably hold gate 23 in a selected open position and thereby define the capacity of bowl 21. The radial distance between each groove 37 is the same as the radial distance between protrusions 48. Gate 23 can be pivoted about pivot 51 to move protrusions 48 into selected grooves 37 to change the measuring size of bowl 21. A notch 38 located between the forward most grooves 37 extends through both lip 33 and rib 34 to allow gate 23 to be separated from body 22. As seen in FIG. 2, when gate 23 is in the sixth open position or release position, one of the protrusions 48 is in alignment with notch 38 and the other protrusion 48 is located forwardly of the front edges of lip 33 and rib 34. Protrusions 48 can then be moved upwardly through notch 38 and adjacent the front edge of lip 33 and rib 34 to separate gate 23 from body 22. This facilitates cleaning of spoon 20.

Referring to FIGS. 13 to 16, gate 23 has a generally triangular shaped top or cover 46 having generally linear front and rear edges and a convex curved side edge. The rear edge of cover 46 aligns with reference indicia 44 on body 22 to indicate the measuring size of bowl 21 when gate is in a selected open position. A partition 49 is connected to the front edge of cover 46. Partition 49 extends downwardly into bowl 21 adjacent the inner surfaces of bowl 21. Partition 49 is a flat rectangular member having generally linear side and bottom edges and rounded lower corners that are complementary in shape to the shapes of the inner surfaces of bowl 21. As shown in FIG. 1, when gate 23 is in the first open position, partition 49 is flush against back wall 29 and the measuring size of bowl 21 is at a maximum, such as one tablespoon. Gate 23 is moveable relative to body 22 to pivot partition 49 away from back wall 29 and thereby reduce the measuring size of bowl 21. The linear side and bottom edges and rounded corner portions of partition 49 have a sliding fit relation with the inner surfaces of bowl 21. This prevents material and fluids being measured from moving past partition 49. Cover 46 closes the top of the space between partition 49 and back wall 29 to prevent substances and fluids being measuring from inadvertently entering this space when partition 49 is moved away from back wall 29.

An arcuate flange 47 is connected to the forward end of the curved side edge of cover 46 adjacent partition 49. Flange 47 has a pair of inwardly directed protrusions 48 that fit into grooves 37 in rib 34 to releasably hold gate 23 in selected open positions. The radial distance between protrusions 48 is substantially the same as the radial distance between each groove 37 and the radial distance between notch 38 and the front edges of lip 33 and rib 34. Protrusions 48 engage lip 33 to hold gate 23 on body 22. When protrusions 48 are located in notch 38 and adjacent the ends of lip 33 and rib 34, gate 23 can be separated from body 22. A ridge 54 projects upwardly from cover 46 to facilitate digital rotation of gate 23.

Figure 11:
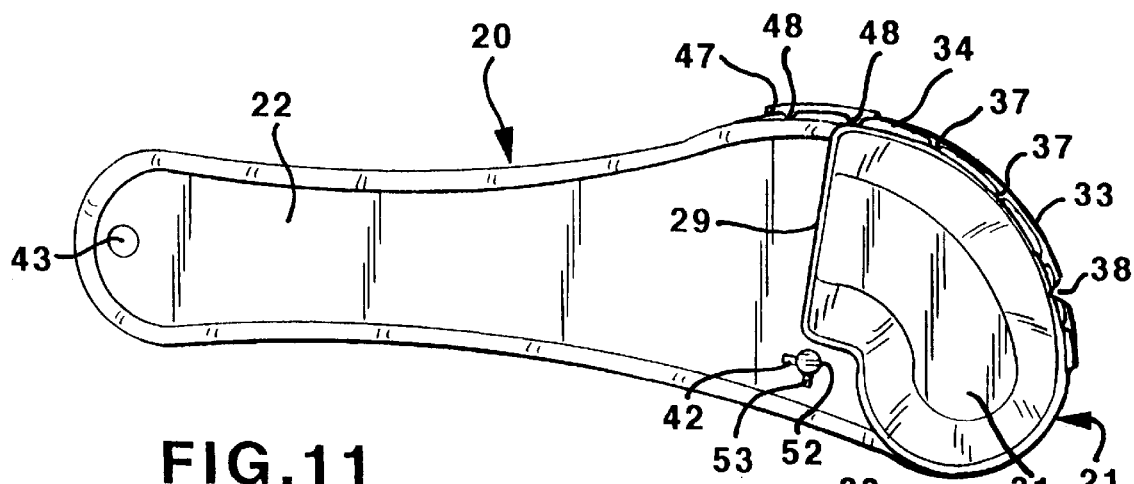
FIG. 11 is a bottom plan view of FIG. 1.
Figure 12:
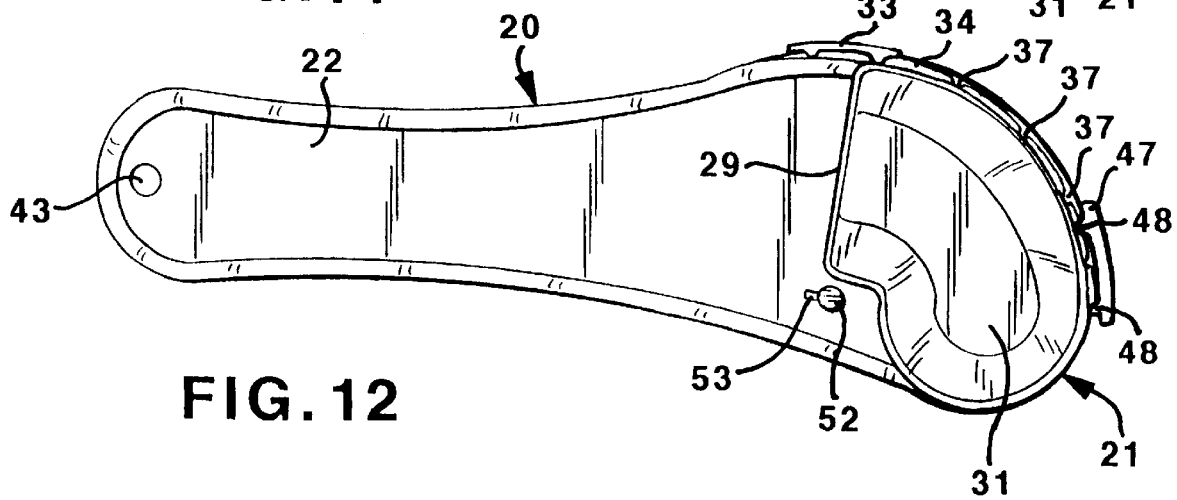
FIG. 12 is a bottom plan view of FIG. 2.

A pivot 51 releasably connects gate 23 to body 22. Pivot 51 has a downwardly directed pin 52 that extends through an opening 41 in body 22 to allow gate 23 to pivot relative to body 22 and adjust the size of bowl 21. A boss 53 located on the lower end of pin 52 engages the bottom of body 22, as seen in FIG. 10. Boss 53 cooperates with protrusions 48 to hold gate 23 on body 22. When gate 23 is pivoted to the release position, boss 53 is aligned with a slot 42 open to opening 41, as seen in FIG. 11 and protrusions 48 are aligned with notch 38 and the front edges of lip 33 and rib 34. Boss 53 can then be moved through slot 42 and protrusions 48 can be moved through notch 38 and along side the front edges of lip 33 and rib 34 to separate gate 23 from body 22.

In use, gate 23 is pivoted to adjust the measuring size of bowl 21 from one to three tablespoons as called for in a recipe, formula and the like. Partition 49 is pivoted toward the front wall 27 of bowl 21 to adjust the measuring capacity of bowl 21 in ½ teaspoon increments. Protrusions 48 engage lip 33 and boss 53 engages the bottom of body 22 to retain gate 23 on body 22. Protrusions 48 fit into grooves 37 in rib 34 to determine the selected measurement. Once the desired measuring size is selected, either scooping material from a container or pouring material into bowl 21 can fill the open space of the bowl. Cover 46 covers the area between partition 49 and back wall 29 of bowl 21. The shape of the outer edges of partition 49 is complementary to the shape of the interior of bowl 21. This prevents substances and liquids being measured from moving under and around partition 49 and inadvertently entering the area between partition 49 and back wall 29 of bowl 21 and ensures the accuracy of measurements.

To clean spoon 20, gate 23 is pivoted counterclockwise to the release position, as shown in FIG. 2. When gate 23 is in the release position, one of the protrusions 48 is aligned with notch 38, the other protrusion 48 clears the ends of lip 33 and rib 34 and boss 53 is in alignment with slot 42. Gate 23 can then be easily separated from body 22 for cleaning of spoon 20.

While there has been shown and described a preferred embodiment of the adjustable measuring spoon of the invention, it is understood that changes in the size and shapes of the adjustable measuring spoon and materials used to make the adjustable measuring spoon can be made by those skilled in the art without departing from the invention. The invention is defined in the following claims.

What is claimed is:

1. A utensil for measuring selected amounts of substances and fluids comprising: a body having a front wall, side walls, and a back wall joined to a bottom wall defining an oval-shaped bowl, said body having a lip with a lower edge extending outwardly from the body, gate means movable relative to the bowl to adjust the measuring capacity of the bowl, and pivot means connecting the gate means to the body, the gate means having a partition extended into the bowl, the partition having a sliding fit relationship with the side walls and bottom wall to determine a measuring capacity of the bowl, the gate means having at least one protusion, said protrusion engaging the lower edge to hold the gate means on the body, the gate means being pivoted about the pivot means to rotate the partition to one or more open positions between the front wall and back wall of the bowl and adjust the measuring capacity of the bowl, the gate means having a cover connected to the partition for covering an area of the bowl between the partition and back wall when the partition is rotated away from the back wall.

2. The utensil of claim 1 wherein: the body has a rib, the rib having a plurality of radially spaced grooves, the gate means including at least one protrusion located in one of the grooves to releasably hold the partition in a selected open position.

3. The utensil of claim 1 wherein: the lip has a notch open to the lower edge allowing the protrusion to pass through the lip.

4. A utensil for measuring selected amounts of substances and fluids comprising: a body having a front wall, side walls, and a back wall joined to a bottom wall defining an oval-shaped bowl, the side walls of the bowl are curved, each side wall having a curvature that is substantially concentric to the curvature of the other side wall, gate means movable relative to the bowl to adjust the measuring capacity of the bowl, and pivot means connecting the gate means to the body, the gate means having a partition extended into the bowl, the partition having a sliding fit relationship with the side walls and bottom wall to determine a measuring capacity of the bowl, the gate means being pivoted about the pivot means to rotate the partition to one or more open positions between the front wall and back wall of the bowl and adjust the measuring capacity of the bowl, the gate means having a cover connected to the partition for covering an area of the bowl between the partition and back wall when the partition is rotated away from the back wall.

5. A utensil for measuring selected amounts of substances and fluids comprising: a body having a front wall, side walls, and a back wall joined to a bottom wall defining an oval-shaped bowl, gate means movable relative to the bowl to adjust the measuring capacity of the bowl, and pivot means connecting the gate means to the body, the pivot means comprises a pin extended through an opening in the body allowing the gate means to pivot relative to the body, the pin having a boss engaging the bottom of the body to releasably hold the gate means on the body, the body including a slot open to the opening, the gate means being pivoted about the pin to a release position to align the boss with the slot and allow the gate means to be separated from the body, the gate means having a partition extended into the bowl, the partition having a sliding fit relationship with the side walls and bottom wall to determine a measuring capacity of the bowl, the gate means being pivoted about the pivot means to rotate the partition to one or more open positions between the front wall and back wall of the bowl and adjust the measuring capacity of the bowl, the gate means having a cover connected to the partition for covering an area of the bowl between the partition and back wall when the partition is rotated away from the back wall.

6. A utensil for measuring selected amounts of substances and fluids comprising: a body having a front wall, side walls, and a back wall joined to a bottom wall defining an oval-shaped bowl, gate means movable relative to the bowl to adjust the measuring capacity of the bowl, and pivot means connecting the gate means to the body, the pivot means includes a boss engaging the bottom of the body to releasably hold the gate means on the body, the gate means having a partition extended into the bowl, the partition having a sliding fit relationship with the side walls and bottom wall to determine a measuring capacity of the bowl, the gate means being pivoted about the pivot means to rotate the partition to one or more open positions between the front wall and back wall of the bowl and adjust the measuring capacity of the bowl, the gate means having a cover connected to the partition for covering an area of the bowl between the partition and back wall when the partition is rotated away from the back wall.

7. The utensil of claim 6 wherein: the body having reference indicia corresponding with the one or more open positions, the cover having a rear edge in alignment with one of the reference indicia to indicate a different measuring capacity of the bowl when the partition is rotated to each open position.

8. A measuring spoon comprising: a body having a front wall, curved side walls, a back wall joined to a bottom wall defining a bowl, gate means having a partition extended into the bowl for adjusting the measuring capacity of the bowl, the partition having a sliding fit relationship with the side walls and bottom wall to determine a measuring capacity of the bowl, the gate means has an arcuate flange located outwardly from one of the side walls, the flange having inwardly directed protrutions, the body having an arcuate lip projecting outwardly from one of the side walls, the lip having a lower edge, the protrusions engaging the lower edge to hold the gate means on the body, pivot means releasably connecting the gate means to the body, the pivot means having a pivot member, the gate means being pivoted about the pivot member to rotate the partition to one or more open positions between the front wall and back wall of the bowl and adjust the measuring capacity of the bowl, and means releasably holding the partition in the one or more open positions.

9. The spoon of claim 8 wherein: the means releasably holding the partition in the one or more open positions comprises an arcuate rib projecting outwardly from the body, the rib having a plurality of radially spaced grooves, the gate means including inwardly directed protrusions located in the grooves to releasably hold the partition in a selected open position.

10. The spoon of claim 8 wherein: the lip has a notch open to the lower edge allowing one of the protrusions to pass through the lip.

11. The spoon of claim 8 wherein: the gate means has a cover connected to the partition for covering an area of the bowl between the partition and back wall when the partition is rotated away from the back wall.

12. The spoon of claim 8 wherein: each side wall has a curvature that is substantially concentric to the curvature of the other side wall, each curvature being coaxial with the axis of rotation of the pivot member.

13. A measuring spoon comprising: a body having a front wall, curved side walls, a back wall joined to a bottom wall defining a bowl, gate means having a partition extended into the bowl for adjusting the measuring capacity of the bowl, the partition having a sliding fit relationship with the side walls and bottom wall to determine a measuring capacity of the bowl, pivot means releasably connecting the gate means to the body, the pivot means having a pivot member, the pivot member has a boss engaging the bottom of the body to releasably hold the gate means on the body, the gate means being pivoted about the pivot member to rotate the partition to one or more open positions between the front wall and back of the bowl and adjust the measuring capacity of the bowl, and means releasably holding the partition in the one or more open positions.

14. The spoon of claim 13 wherein: the body has a slot open to an opening accommodating the pivot member, the gate means being pivoted about the pivot member to a release position to align the boss with the slot and allow the gate means to be separated from the body.

15. A spoon for measuring different quantities of material comprising: a body having a bowl, gate means for adjusting the measuring capacity of the bowl, and pivot means releaseably connecting the gate means to the body and allowing pivotal movement of the gate means relative to the body to adjust the measuring capacity of bowl, the pivot means comprising a pin extended through a hole in the body, the pin having a boss engaging the bottom of the body to releaseably hold the gate means on the body, the body having a slot open to the hole whereby when the gate means is pivoted to a release position, boss is in alignment with the slot to allow separation of the gate means and body.

16. The spoon of claim 15 wherein: the gate means has a partition extended into the bowl, the partition having a sliding fit relationship with the side walls and bottom wall to determine a measuring capacity of the bowl.

17. The spoon of claim 15 wherein: the gate means has a cover for covering an area of the bowl when the measuring capacity of the bowl is less than its maximum capacity.

18. The spoon of claim 15 wherein: the side walls of the bowl are curved, each side wall having a curvature that is substantially concentric to the curvature of the other side wall.

19. The spoon of claim 15 wherein: the body has reference indicia corresponding with the capacity of the bowl, the gate means having a rear edge in alignment with one of the reference indicia to indicate the measuring capacity of the bowl.

* * * * *